United States Patent [19]
Freedman

[11] Patent Number: 5,914,165
[45] Date of Patent: Jun. 22, 1999

[54] PEELABLE LABEL FOR ARTICLES FOR RESALE

[75] Inventor: Melvin S. Freedman, Beachwood, Ohio

[73] Assignee: Avery Dennison Corporation, Pasadena, Calif.

[21] Appl. No.: 08/681,801

[22] Filed: Jul. 29, 1996

[51] Int. Cl.$^6$ ....................................................... B32B 7/06
[52] U.S. Cl. ........................ 428/40.1; 283/81; 428/41.3; 428/41.6; 428/41.7; 428/41.8; 428/42.2; 428/42.3; 428/43; 428/192; 428/213; 428/354
[58] Field of Search ................................. 428/40.1, 41.3, 428/41.6, 41.7, 41.8, 42.1, 42.2, 43, 192, 194, 213, 354; 283/81

[56] References Cited

U.S. PATENT DOCUMENTS

| | | | |
|---|---|---|---|
| 4,837,088 | 6/1989 | Freedman | 156/243 |
| 4,925,714 | 5/1990 | Freedman | 428/40 |
| 4,977,006 | 12/1990 | Smith | 428/42.1 |
| 5,516,393 | 5/1996 | Freedman | 156/229 |
| 5,520,760 | 5/1996 | Freedman | 156/152 |

FOREIGN PATENT DOCUMENTS

| | | |
|---|---|---|
| 9206836 | 4/1992 | WIPO . |
| 9317411 | 9/1993 | WIPO . |
| 9322116 | 11/1993 | WIPO . |

*Primary Examiner*—Nasser Ahmad
*Attorney, Agent, or Firm*—Renner, Otto, Boisselle & Sklar

[57] ABSTRACT

This invention relates a peelable label for articles comprising (A) a first and second layer of polymeric film, wherein each layer has an upper and lower surface, the upper surface of the first layer is peelably attached to the lower surface of the second layer at a separation interface, and at least the second film has at least one tear propagation point, and (B) an adhesive layer, having an upper and lower surface, wherein the upper surface of the adhesive layer is bonded to the lower surface of the first layer. The label may have a third layer of polymeric film on the upper surface of the second layer. When such third layer is present, at least the third layer, and more often the second and third layers will have at least one tear propagation point. The present invention also relates to a method of making a peelable labels and to articles with the peelable labels attached thereto. The present labels provide a way of removing a portion of the second layer of the label containing information such as the price, and leaving a portion of the second layer of the label containing other information such as the product bar code. The remaining portion of the second layer subsequently may be removed to provide a surface to receive a new label.

Since the second layer contains no adhesive, it is not possible to remove either the whole layer or a portion of the second layer (e.g., the pricing information) and reapply it to another item in a manner which will not be detected.

28 Claims, 1 Drawing Sheet

PEELABLE LABEL FOR ARTICLES FOR RESALE

TECHNICAL FIELD OF THE INVENTION

This invention relates labels, methods of making the labels, and articles onto which the labels are applied. The labels are peelable and have at least one tear propagation point.

BACKGROUND OF THE INVENTION

Labels have been used to provide pricing information of articles to customers. The conventional label involves a paper or film label with an adhesive layer. This system is low in cost and can be provided with means to prevent removal and repositioning of the label on another item.

Piggy back labels are labels which are "piggy backed" on another layer of material (lower layer) which has adhesive applied to it on one side and a release coating on the other side. The piggy back label has an adhesive applied to it so that the adhesive of the piggy back label is in contact with the release coating of the aforementioned lower layer. Pricing and bar code information are placed on the piggy back label. Piggy back labels are easily removed for relabelling. However, a disadvantage of the piggy back label is that the label is too easily removed and can be reapplied to another (higher cost) item. Additionally, removal of the lower layer may damage the package surface, and adhering a new label to the silicone coated lower layer is difficult.

It is desirable to have a label, suitable for use on packaging, where the price may be removed without destroying the package.

SUMMARY OF THE INVENTION

This invention relates a peelable label for articles comprising (A) a first and second layer of different polymeric films, wherein each layer has an upper and lower surface, the upper surface of the first layer is peelably attached to the lower surface of the second layer at a separation interface, and at least the second film has at least one tear propagation point, and (B) an adhesive layer, having an upper and lower surface, wherein the upper surface of the adhesive layer is bonded to the lower surface of the first layer. The label may have a third layer of polymeric film on the upper surface of the second layer. When such third layer is present, at least the third layer, and more often the second and third layers will have at least one tear propagation point. The present invention also relates to a method of making a peelable label useful for pricing packages comprising the steps of (1) coextruding a film having a first layer and second layer each having an upper and lower surface, wherein the upper surface of the first layer is peelably attached to the lower surface of the second layer at a separation interface, (2) applying an adhesive layer with an upper and lower surface, where the upper surface of the adhesive layer is bonded to the lower surface of the first layer, and (3) forming at least one tear propagation point in at least the second layer. The invention also relates to articles with the peelable labels attached thereto.

The present labels provide a way of removing a portion of the second layer of the label containing information such as the price, and leaving a portion of the second layer of the label containing other information such as the product bar code. The remaining portion of the second layer subsequently may be removed to provide a surface to receive a new label. Since the second layer contains no adhesive, it is not possible to remove either the whole layer or a portion of the second layer (e.g., the pricing information) and reapply it to another item in a manner which will not be detected.

DETAILED DESCRIPTION OF THE PREFERRED EMBODIMENTS

One feature of the labels of the present invention is the separation interface between the first and second layers of the peelable label. The term "separation interface" refers to the interface between the first and second polymeric films of the label. The films are peelably attached to each other and present to each other surfaces of different composition. The films adhere to each other to a sufficiently high degree to withstand the maximum separation forces imposed as the labels are processed. However, the films adhere to each other to a sufficiently low degree to allow them to cleanly and readily separate from each other under the imposition of stripping or separation forces greater than the maximum separation forces to which they have been exposed during label preparation. The separation interface has also been referred to as a "peelable interface" in U.S. Pat. No. 4,925,714, issued to Freedman, the disclosure of which is incorporated by reference. The separation peel strength at the separation interface is a function of several parameters, including, among others, the identities of the two dissimilar polymeric layers, the presence and types of additives in one or both of the coextruded films, the presence or absence of pigments in one or both films. The separation interface typically has a peel strength in the range of less than about 400, or from about 30 to about 200, or from about 50 to about 175 grams per 2-inch width at 90° peel.

Another characteristic of the invention is the incorporation of a "tear propagation point". As used in the specification and claims, the term "tear propagation point" refers to a place on the peelable label where a portion of at least the second layer of the peelable label may be torn (preferably in a straight line) along the separation interface. A portion of the second layer of the label then remains. The tear propagation point provides a point at which the tear may begin and continue across the label. Examples of tear propagation points include a notch, etch or perforation in the polymeric film. The direction along which the tear moves is the tear propagation axis.

The labels of the invention may be prepared from unoriented or oriented films. When the films used to prepare the label have been oriented such as by stretching in the machine direction, the tear propagation axis is in the machine direction (see FIG. 3), and a notch is sufficient to result in a tear which is a straight line in the machine direction. When the films have not been oriented in the machine direction, a notch and one or more perforations across the machine direction of the film (see FIG. 3a) are preferred in order to obtain a straight line tear in the machine direction.

Figure 1:
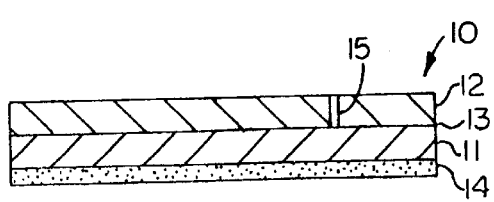
FIG. 1 is a cross sectional area of a peelable label.

The embodiments of the invention are further illustrated in FIGS. 1–5. In FIG. 1, a peelable label 10 comprises a first layer 11, a second layer 12 and an adhesive layer 14. The upper surface of the first layer 11 and the lower surface of second layer 12 are peelably attached at separation interface 13. Generally, the first layer has a thickness from about 0.1 to about 2, or from about 0.2 to about 1 or from about 0.3 to about 0.8 mils. The second layer generally has a thickness from about 0.5 to about 5, or from about 0.7 to about 4, or from about 1 to about 3 mils. In one embodiment, the first layer is thin and the second layer is thicker than the first layer.

Layers 11 and 12 may be coextruded dissimilar polymer films, and each layer generally is derived from at least one polyolefin. The polyolefin may be a homo or interpolymer, e.g. a copolymer or terpolymer, of olefins containing from 2 to about 30, or from about 2 to about 12, or from about 2 to about 6 carbon atoms. In one embodiment, layers 11 and 12 are independently composed of polyethylene, polypropylene, polybutylene, polyethylene copolymers and terpolymers and polypropylene copolymers and terpolymers, and mixtures or two or more thereof. The polyethylene and polypropylene copolymers and terpolymers are interpolymers of ethylene or propylene together with one or more olefin monomers having from about 2 to about 12, or from about 2 to about 6 carbon atoms. Examples of the other monomers include ethylene, propylene, butene, hexene, etc. Typically the other monomer is present in an amount from about 3% up to about 20%, or from about 5% to about 19%, or from about 8% to about 18%. Preferred other monomers are ethylene and 1-butene for propylene and propylene and 1-butene for ethylene. Typically these polymers have a melt index of about 2 to about 4 g/10 min. or a number average molecular weight of about 150,000 to about 500,000. Examples of propylene copolymers include CEFOR™ resin SRD4105 which contains 14% by weight comonomer. Other resins include polypropylene random copolymers 6C44 (5.5% ethylene), DS6D81 (5.7% ethylene), and DS6D82 (5.7% ethylene). The CEFOR™ and random polypropylene polymers are available commercially from Union Carbide Company. Preferably layers 11 and 12 are polyethylene and polypropylene, respectively. In another embodiment, layers 11 and 12 are polypropylene and polyethylene, respectively.

In FIG. 1, an adhesive layer 14 is bonded to the lower surface of layer 11. In another embodiment, layers 11 and 12 and the adhesive layer 14 may be coextruded. The adhesive is a pressure-sensitive adhesive such as those utilized commercially for label construction. An example of a useful pressure sensitive adhesive is available commercially from H. B. Fuller of Blue Ash, Ohio under product number HM727 (a blend of ethylene-vinyl acetate copolymer, polyethylene waxes and a tackifier). In one embodiment, the adhesive layer is in contact with a release liner.

In FIG. 1, a tear propagation point 15 is found in the second layer 12. The tear propagation point may be at any convenient place along the label. In one embodiment, the tear propagation point is positioned so the label is divisable in a major portion, for example, 75% of the area of the label, and a minor portion, for example, 25% of the area of the label. The tear propagation point may be a notch, etch, perforation or any means for initiating and propagating a tear. The tear propagation point may be only in the second layer, or the tear propagation point may be through both the first and second layers and a third layer, when present. The tear propagation point is always present in at least one of the upper peelable layers which in the above embodiment is either the second layer or the second and third layers combined. The third layer is discussed below.

In another embodiment, the first layer 11, the second layer 12 (or both layers may contain pigments or laser imagible additives. The pigments may be any of those used to impart color to the films, such as titanium dioxide, carbon black, chrome yellow, molybdenum orange, iron oxide red, etc. The laser imagible additives are known in the art. For instance, titanium coated mica may be used. The pigments and imagible additives are present in the polymeric layers at a level from about 0.1% to about 20% by weight.

Figure 2:
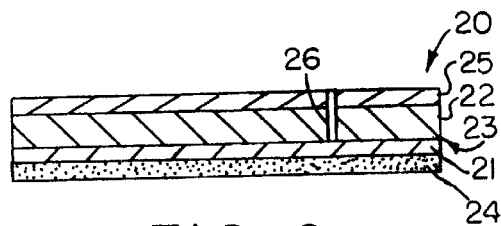
FIG. 2 is a cross sectional area of another peelable label.

In FIG. 2, peelable label 20 has a thin first layer 21, a thicker second layer 22, a third (top) layer 25, and an adhesive layer 24. The upper surface of the first layer 21 is peelably attached to the lower surface of the second layer 22 at separation interface 23. An adhesive layer 24 is bonded to the lower surface of layer 21. A third layer of polymeric film 25 is bonded to the upper surface of the second layer 22. Tear propagation point 26 is found in second layer 22 and third layer 25. Generally, the third layer has a thickness from about 0.1 to about 2, or from about 0.2 to about 1 or from about 0.3 to about 0.8 mils.

The third layer may be composed of any polymer, and in one embodiment, the polymer is thermal transfer printable. Examples of polymers which may be used to form the third layer include the above polyolefins and polymers such as polyethylene methyl acrylate, polyvinyl acetate, polyethylene ethyl acrylate, polymethylmethacrylates, acrylonitrile butadiene styrene polymer, nylon, polybutylene, polystyrene, polyurethane, polysulfone, polyvinylidene chloride, polypropylene, polypropylene copolymers, polycarbonate, polymethylpentene, styrene maleic anhydride polymer, styrene acrylonitrile polymer, ionomers based on sodium or zinc salts of ethylene/methylacrylic, cellulosics, fluoroplastics, polyacrylonitriles, and thermoplastic polyesters.

Figure 3:
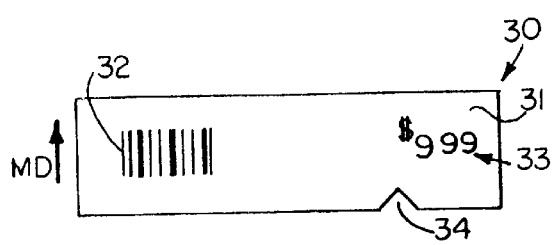
FIGS. 3, 3a, 3b and 3c are drawings of the top surface of a peelable label, showing removal of a portion of the top layer of the label.

FIG. 3, illustrates a top view of a peelable label 30 similar in construction to the label shown in FIG. 1. Peelable label 30 contains a second layer 31 with bar code product information 32 and pricing information 33. Bar code technology is known to those in the art. Label 30 has a tear propagation point which is a notch 34 in the second layer 31. The notch 34 is in the machine direction (MD) and the films have been oriented in the machine directions as noted.

Figure 3A:
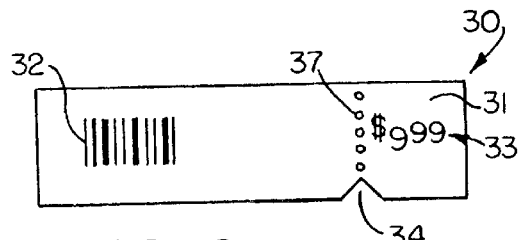

FIG. 3(a) is a top view of a label as in FIG. 3 except that the films of the label have not been oriented in the machine direction and the tear propagation point comprises a notch 34 and perforations 37. The tear propagation axis will be along the perforations which may be in the machine direction or the cross direction of the film.

Figure 3B:
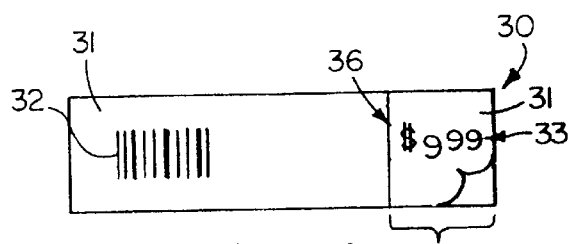

In FIG. 3b, a portion of second layer 31 is being removed from label 30 by peeling back section 35 at notch 34. The peeling back of section 35 from the second layer 31 proceeds along tear propagation axis 36.

Figure 3C:
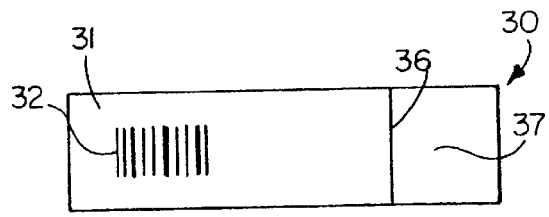

In FIG. 3c, the portion of the second layer 31 having the pricing information has been removed. The portion of the second layer 31 with bar code information 32 remains. A portion of first layer 37 is exposed.

Figure 4:
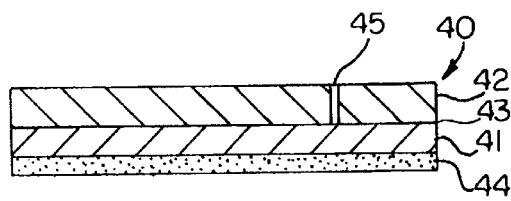
FIGS. 4, 4a and 4b are drawings of the cross section of a peelable label showing removal of a portion of the top layer of the label.

FIG. 4 is a cross sectional view of a peelable label 40 similar to the label of FIG. 3 illustrating removal of a portion of the second layer 42. Label 40 has first layer 41 and second layer 42 where the upper surface of the first layer 41 peelably contacts the lower surface of the second layer 42 at separation interface 43. An adhesive layer 44 is bonded to the lower surface of the first layer 41. The tear propagation point in the second layer 42 is notch and/or perforations 45.

Figure 4A:
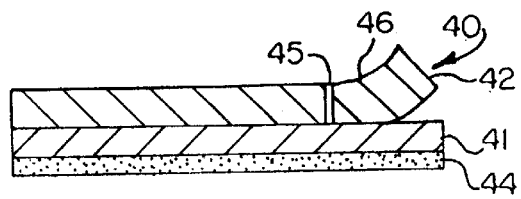
Figure 4B:
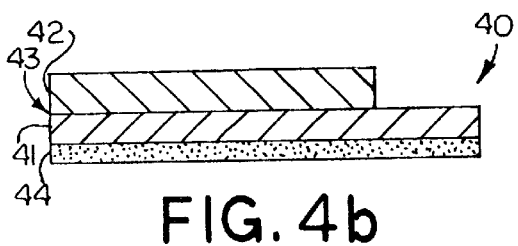

In FIG. 4a, a portion 46 of the second layer 42 is removed by peeling back second layer 42 along tear propagation axis 45. In FIG. 4b, the label 40 has a portion of the second layer 42 removed, and a portion of the first layer 41 is exposed. The remaining portion of the second layer 42 is peelably contacting the first layer 41 at separation interface 43. The first layer 41 is bonded to the adhesive layer 44.

Figure 5:
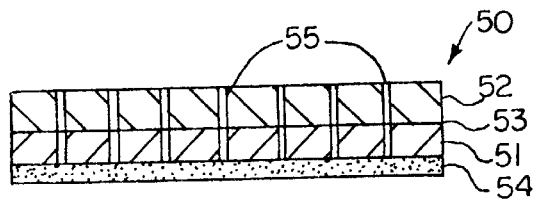
FIG. 5 is a drawing of a cross sectional area of a peelable label having multiple tear propagations.

In FIG. 5, label 50 has a first layer 51 peelably attached to second layer 52 at a separation interface 53. The first layer is also bonded to adhesive layer 54. The first and second layers, 51 and 52 respectively, have a multiplicity of tear propagation points 55. In one embodiment, the label has tear propagation points at even intervals, such as from about 0.1 to about 0.5 inches between each tear propagation.

In another embodiment, the peelable labels of the invention have at least one edge which may be modified to facilitate peeling. For example, the label may be provided with a starting or lift-tab at one or more edges such as described in U.S. Pat. No. 5,520,760 (Freedman). The disclosure of this patent is hereby incorporated by reference. If the separation interface is peeled or separated along narrow paths, and the freshly separated surfaces are immediately brought back into contact, the two films cling to each other in tight overlying relation but the two films do not stick to each other, or at least not to the degree that interferes with their functioning as lift tabs. The peeling apart of the plies of film at the interface can be accomplished using footed cutter means as described in U.S. Pat. No. 5,520,760. In another embodiment, the label has a portion or edge of the second layer, or the third layer when present, coated with a UV curable material. For example, an ink or varnish used on the second or third layer may be selected to shrink upon curing by exposure to UV radiation. As the ink or varnish coating shrinks the edge of the label is pulled up breaking the bond at the interface thereby facilitating the peeling process. For example a band of UV curable varnish such as a UV curable epoxy acrylate containing UV stabilizers and antioxidants can be deposited along an edge of the second or top layer of the peelable label. Examples of useful UV curable epoxy acrylates are available commercially from Rad-Cure Corp., Livingston, N.J. under the trade designations Rad-Kote 814 and Rad-Kote 818.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A peelable label for articles comprising (A) a first and second layer of different polymeric films, wherein each layer has an upper and lower surface, the upper surface of the first layer is peelably attached to the lower surface of the second layer at a separation interface, and at least the second film has at least one tear propagation point, and (B) an adhesive layer, having an upper and lower surface, wherein the upper surface of the adhesive layer is bonded to the lower surface of the first layer.

2. The label of claim 1 wherein the separation interface between the first and second layers has a peel strength in the range of about 30 to about 200 grams per 2-inch width at 90° peel.

3. The label of claim 1 wherein the first and second layers are each independently composed of at least one polyolefin.

4. The label of claim 1 wherein the first and second layers are each independently composed of polyethylene, polypropylene, polypropylene copolymers or mixtures thereof.

5. The label of claim 1 wherein at least the second layer includes pigments or laser imageable additives.

6. The label of claim 1 wherein the tear propagation point is a notch or a perforation or a combination thereof.

7. The label of claim 1 wherein the films of the first and second layers have been machine direction oriented, and the tear propagation point is a notch in the machine direction of the films.

8. The label of claim 1 further comprising a release liner on the lower surface of the adhesive layer.

9. The label of claim 1 further comprising a third layer of polymeric film having an upper and lower surface wherein the lower surface of the third layer is bonded to the upper surface of the second layer, and at least the third layer has a tear propagation point.

10. The label of claim 9 wherein the third layer is thermal transfer printable.

11. The label of claim 1 wherein the first layer has a thickness of about 0.1 to about 2 mils and the second layer has a thickness of about 0.5 to about 5 mils.

12. The label of claim 1 wherein the first and second layers have a multiplicity of tear propagations.

13. A peelable label for articles comprising (A) a thin first layer and a thicker second layer of different polymeric films each having an upper and lower surface and wherein the upper surface of the first layer is peelably attached to the lower surface of the second layer at a separation interface and at least the second layer has at least one tear propagation point, and (B) an adhesive layer with an upper and lower surface, wherein the upper surface of the adhesive layer is bonded to the lower surface of the first layer.

14. The label of claim 13 wherein the separation interface between the skin and base layers has a peel strength in the range of about 30 to about 200 grams per 2-inch width at 90° peel.

15. The label of claim 13 wherein the first and second layers are each independently composed of at least one polyolefin.

16. The label of claim 13 wherein the first and second layers are each independently composed of polyethylene, polypropylene, polypropylene copolymers or mixtures thereof.

17. The label of claim 13 wherein at least the second layer includes pigments or laser imageable additives.

18. The label of claim 13 further comprising a release liner on the lower surface of the adhesive layer.

19. The label of claim 13 further comprising a third layer of polymeric film having an upper and lower surface, wherein the lower surface of the third layer is bonded to the upper surface of the second layer, and at least the third layer has a tear propagation point.

20. The label of claim 19 wherein the third layer is thermal transfer printable.

21. The label of claim 13 wherein the films of the first and second layers have been oriented in the machine direction and the tear propagation point is a notch in the machine direction.

22. The label of 13 wherein the first and second layers have a multiplicity of tear propagations.

23. A peelable label comprising (A) a first and second layer of different polymeric film, wherein each layer has an upper and lower surface, the upper surface of the first layer is peelably attached to the lower surface of the second layer at a separation interface, and at least the second film has at least one tear propagation point, (B) an adhesive layer, having an upper and lower surface, wherein the upper surface of the adhesive layer is bonded to the lower surface of the first layer, and (C) a UV curable coating on at least a portion of the upper surface of the second layer.

24. The label of claim 23 wherein the UV curable coating is on an outer edge of the second layer.

25. A peelable label comprising (A) a first, second and third layer of different polymeric films, wherein each layer has an upper and lower surface, the upper surface of the first layer is peelably attached to the lower surface of the second layer at a separation interface, at least the third layer has at least one tear propagation point, and the upper surface of the second layer is bonded to the lower surface of the third layer, (B) an adhesive layer, having an upper and lower surface, wherein the upper surface of the adhesive layer is bonded to the lower surface of the first layer, and (C) a UV curable coating on at least a portion of the upper surface of the third layer.

26. The label of claim 25 wherein the UV curable coating is on an outer edge of the third layer.

27. An article having attached thereto the label of claim 1.

28. An article having attached thereto the label of claim 13.

* * * * *